United States Patent [19]
Luppens

[11] 3,913,968
[45] Oct. 21, 1975

[54] COLLAPSIBLE CAMPER
[75] Inventor: Patrick M. Luppens, O'Fallon, Ill.
[73] Assignee: Robert B. Schoolcraft, St. Petersburg, Fla.
[22] Filed: May 17, 1974
[21] Appl. No.: 470,958

[52] U.S. Cl. ............... 296/23 R; 135/4 A; 135/5 A; 224/30 R; 296/136
[51] Int. Cl.² .......................................... B60P 3/32
[58] Field of Search ................ 296/23 R, 78.1, 136; 135/1 A, 3 A, 4 A, 5 A, 5 AT; 224/33 R, 33 A, 30 R, 31, 42.1 E, 42.1 R, 42.1 F

[56] References Cited
UNITED STATES PATENTS
2,831,489  11/1956  Weber .............................. 135/4 A
2,956,573  10/1960  Brown ............................... 135/5 A FOREIGN PATENTS OR APPLICATIONS
24,247    4/1898   United Kingdom .............. 296/78.1
391,205   8/1965   Switzerland ....................... 135/5 A
371,868   10/1963  Switzerland ....................... 135/5 A
623,405   7/1961   Italy ................................. 296/23 R Primary Examiner—Robert J. Spar
Assistant Examiner—Gary Auton
Attorney, Agent, or Firm—Stein & Orman

[57] ABSTRACT

A collapsible camper comprising a collapsible support frame including a front and rear assembly specifically configured to support a tent covering in combination with a bicycle frame.

14 Claims, 8 Drawing Figures

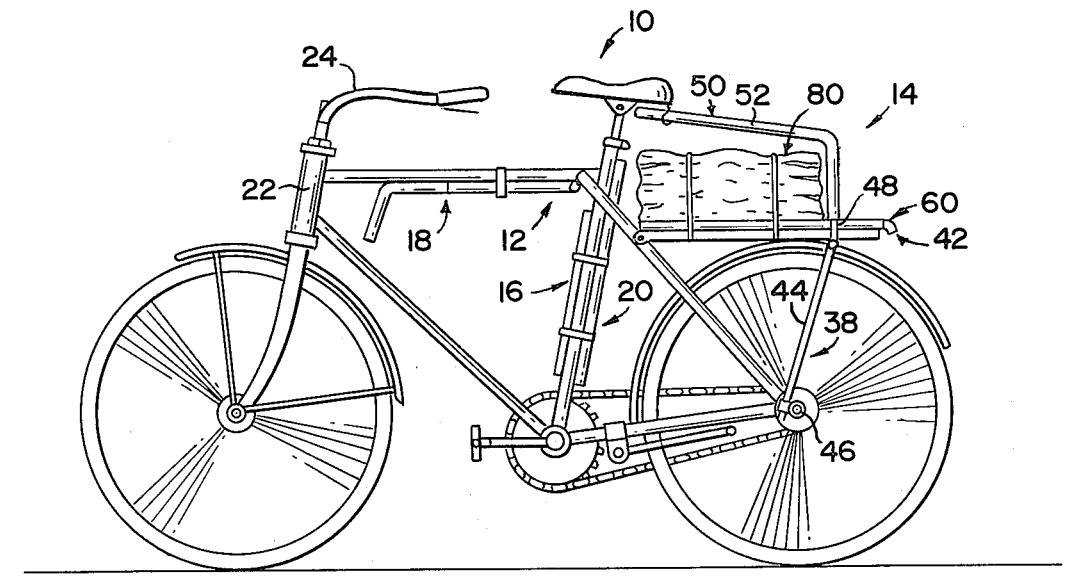
FIG. 1
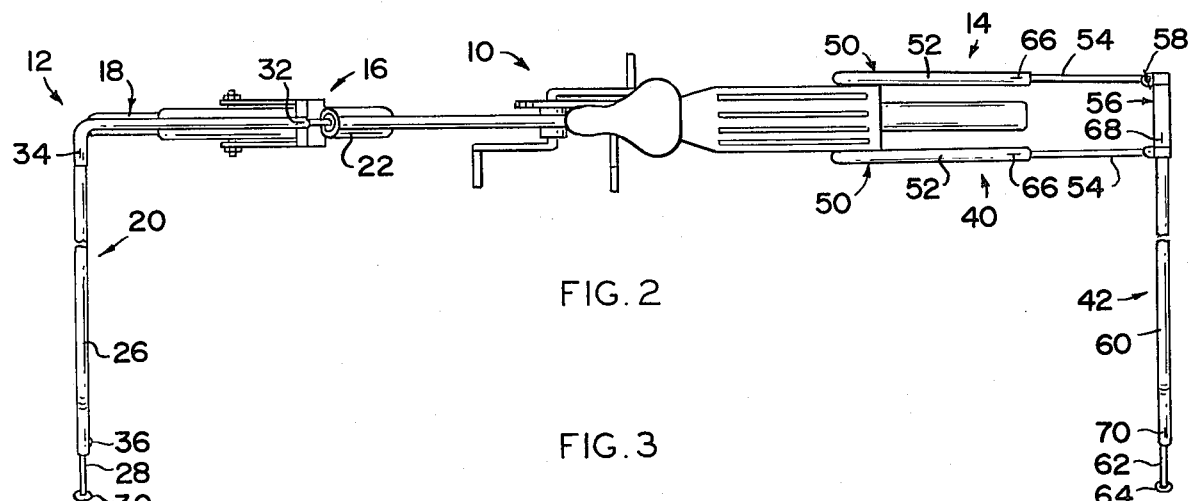
FIG. 2
FIG. 3
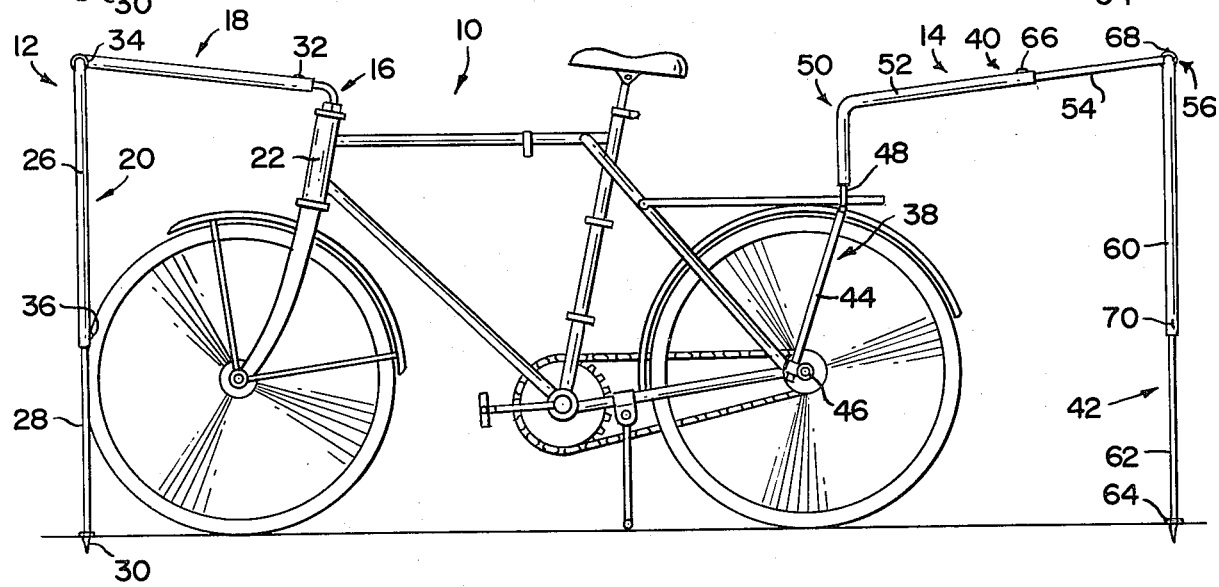

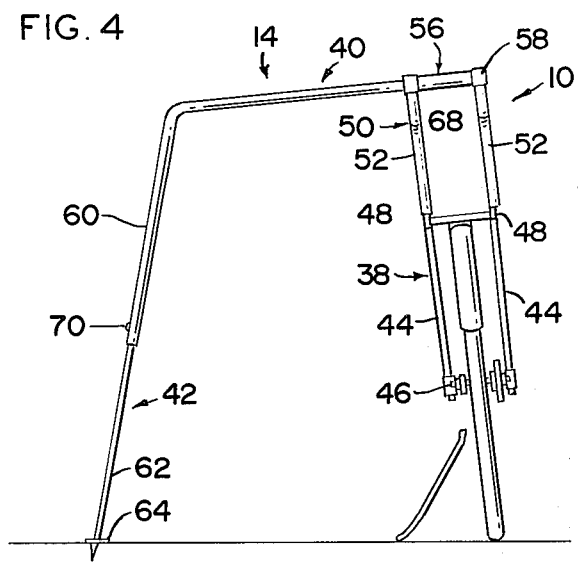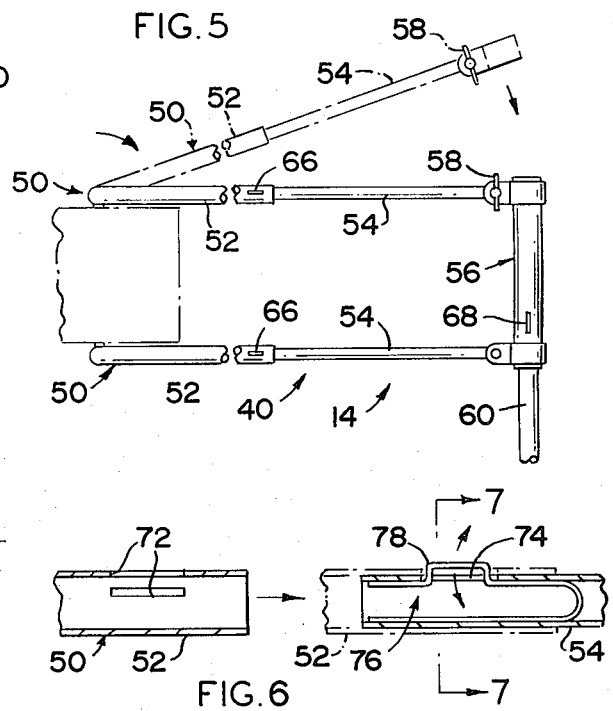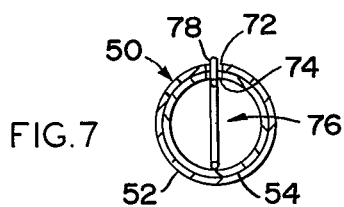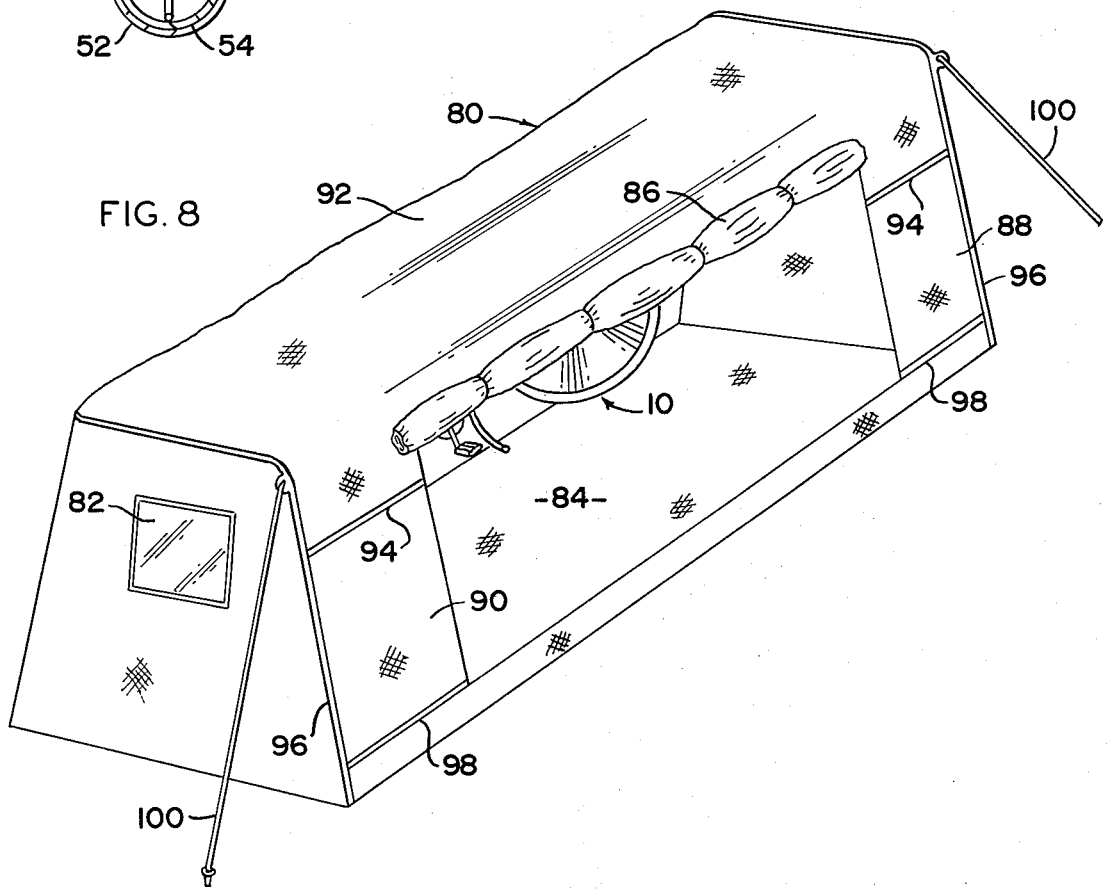

COLLAPSIBLE CAMPER

BACKGROUND OF THE INVENTION

1. Field of the Invention

A collapsible camper specifically configured to mount upon a bicycle frame.

2. Description of the Prior Art

In recent years, interest in nature and the outdoors has vastly increased. Attending this increased interest is a significant increase in outdoor camping. Many persons and families find camping a particularly economical way to vacation. Others enjoy the travel aspect of camping. Still others find camping an aid to fishing, hunting and other outdoor activity.

This great increase in camping has caused a tremendous need for camping equipment of all types. Camping shelters, more easily called "campers" have ranged from a simple canvas tent to elaborate self-contained vans with all the comforts of home. The most popular campers, however, are those which offer the convenience of mobility without the need to assemble the shelter to any great extent after reaching the campsite. Thus, trailers and vans mounted on quarter or half-ton pickup trucks, are most popular. They are popular because they do not hamper the driver of the vehicle and they are quickly assembled if at all required.

With trailers, a second vehicle is obviously required, and such causes increased license fees and tolls, adds driving hazards and frequently limits the area of accessibility to the car-trailer combination.

With truck mounted vans, the expense involved for the camper and the truck itself is too much for the occasional camper. Attempts have been made to mount camp shelters on an automobile to overcome the above undesirable attributes of trailers or van type campers, but with only moderate success. For example, U.S. Pat. Nos. 3,097,013 and 3,115,362 show vehicle mounted campers but each is difficult to assemble and each adds a rather extensive length to the original vehicle structure, hampering the driver's visibility and adversely affecting the roadability of the altered vehicle. U.S. Pat. Nos. 1,984,681 and 2,561,168 are other variations, though earlier, which have not been accepted by the consumer probably due to their complicated structure or assembly requirements once the campsite has been reached.

With the increase in bicycle riding and camping there is a need for a tent-camper configured to be mounted on the bicycle frame without interferring with the normal bicycle operation. None of the prior art described fulfills this requirement. Thus, there is a need for a tent frame configured to provide a camper which can be mounted on a bicycle frame.

SUMMARY OF THE INVENTION

The present invention relates to a collapsible camper specifically configured to be carried on a bicycle frame. More particularly, the collapsible camper comprises a collapsible support frame including a front and rear assembly configured to support a tent covering in combination with the bicycle frame.

The front assembly comprises a forward attachment means, forward interconnect means and adjustable forward support means. The forward attachment means is fixedly attached to the fork and handle bar assembly when in the erected position. The forward interconnect means comprises a substantially L-shaped member extending forwardly along the longitudinal axis of the bicycle frame and outwardly to one side thereof to interconnect the forward attachment means and the forward support means. The adjustable forward support means comprises an upper, substantially L-shaped element and a lower element including a forward securing means formed on the lower portion thereof to secure the front assembly to the ground or other supporting surface when fully erected.

The front assembly further includes a forward attachment lock means, a forward interconnect lock means and a forward support lock means. The forward attachment lock means the forward attachment means to the forward interconnect means. The forward interconnect lock means fixes the rotational position of the forward interconnect means relative to the forward support means when operatively assembled, while the forward support lock means fixes the longitudinal extension of the lower support element relative to the upper support element when in the erected position.

The rear assembly comprises a rear attachment means, rear interconnect means and adjustable rear support means. The rear attachment means may comprise a pair of rear struts extending upwardly from the rear axle or simply an extension of existing struts. The rear interconnect means comprises a pair of extendable substantially L-shaped members pivotally connected to the rear attachment means strut extensions. The L-shaped members are substantially paralled when erected and extend rearwardly along the longitudinal axis of the bike frame and are coupled at the rearward end to one another to maintain the fixed base parallel relationship by coupling means extending therebetween. The adjustable rear support means comprises an upper substantially L-shaped element pivotally attachable to the coupling means and a lower element including a rear securing means formed on the lower portion thereof to secure the rear assembly to the ground or other supporting surface when in fully erected position. The rear assembly further includes a rear interconnect lock means and a rear support lock means. The rear interconnect lock means fixes the rotation and longitudinal position of the coupling means relative to the rear support means when operatively assembled. The rear support lock means fixes the longitudinal position of the upper element relative to the lower element when in the erected position.

The tent covering may comprise a canvas-like fabric or other suitable material for protecting the tent occupants from the elements.

To set up the camper, the tent covering is placed on the ground. Then the bicycle is stood on its kick-stand with the rear wheel on the flooring of the tent covering. The handle bars are then removed permitting attachment of the forward attaching means to the fork. Of course, with suitable coupling means the forward attachment means may be fixed directly to the handle bar assembly itself. The forward interconnect means is then operatively attached to the forward attachment means and the forward support means is attached to and locked in operative position relative to the forward interconnect means. The lower element is then extended downwardly to the desired height at which time the forward support lock means is operative to secure the front assembly in position. The rear assembly is similarly positioned by pivoting the interconnect members to extend rearwardly relative to the bike frame and interconnected by the coupling means to maintain their spaced parallel relationship relative to each other. The first and second interconnect members are extended rearwardly relative to operative position by the rear interlock means. The rear support means is then operatively attached to the rear interconnect means and locked in place by the rear interconnect lock means. The lower rear support element is then extended downwardly relative to the upper support element to the desired position and locked in place by the rear support lock means. The frame thus assembled, the tent covering is then secured thereto to complete the assembly of the collapsible camper.

The invention accordingly comprises the features of construction, combination of elements and arrangement of parts which will exemplified in the construction hereinafter set forth and the scope of the invention will be indicated in the claims.

BRIEF DESCRIPTION OF THE DRAWINGS

For a fuller understanding of the nature and objects of the invention, reference should be had to the following detailed description taken in connection with the accompanying drawings in which:

FIG. 1 is a side view of the camper in the transit position mounted on a bicycle.

FIG. 2 is a top view of the camper in the erected position.

FIG. 3 is a side view of the camper in the erected position.

FIG. 4 is a rear view of the camper in the erected position.

FIG. 5 is a top detailed view of the rear assembly.

FIG. 6 is a detailed cross-sectional side view of the various lock means.

FIG. 7 is a cross-sectional end view of the lock means taken along line 7—7 of FIG. 6.

FIG. 8 is a perspective view of the camper in the erected position.

Similar reference characters refer to similar parts throughout the several views of the drawings.

DETAILED DESCRIPTION OF THE PREFERRED EMBODIMENT

As best shown in FIGS. 1 through 4, the present invention relates to a collapsible camper specifically configured to be conveniently carried on a bicycle frame generally indicated as 10 during travel which comprises a collapsible support frame to support a tent covering, best shown in FIG. 8, on a bicycle frame 10. As best shown in FIGS. 2 through 4, the collapsible support frame includes a front and rear assembly 12 and 14 respectively configured to support the tent covering as more fully described hereinafter.

As best shown in FIGS. 2 and 3, the front assembly 12 comprises a forward attachment means generally indicated as 16, forward interconnect means generally indicated as 18 and forward support means generally indicated as 20. The forward attachment means 16 comprises a substantially L-shaped member configured to mount within fork 22 of frame 10 as best shown in FIGS. 2 and 3. Of course, with other attachment means the forward attachment means 16 may be coupled directly to the handle bar assembly 24 shown in FIG. 1. The forward interconnect means 18 comprises a substantially L-shaped member configured to cooperatively engage the forward portion of forward attachment means 16 as best shown in FIGS. 2 and 3. The forward support means comprises an upper and lower element 26 and 28 respectively. Forward upper element 26 comprises a substantially L-shaped member configured to cooperatively engage forward interconnect means 18 and lower forward element 28. Formed on the lower portion of forward lower element 28 is forward securing means 30 to secure forward assembly 12 to the ground or other supporting surface.

In addition, forward assembly 18 includes first, second and third forward lock means generally indicated as 32, 34 and 36 respectively to operatively interlock forward attachment means 16, forward interconnect means 18 and forward support means 20. The forward lock means 32, 34 and 36 will be described more fully hereinafter with reference to FIGS. 6 and 7.

As best shown in FIGS. 2 through 5, the rear assembly 14 comprises a rearward attachment means generally indicated as 38, rearward interconnect means generally indicated as 40 and rearward support means generally indicated as 42. The rearward attachment means 38 comprises a pair of struts 44 attached to the lower end to rear axle 46 and strut extender 48 extending upwardly to engage rearward interconnect means 40. Rearward interconnect means 40 comprises a pair of members 50 attached to opposite sides of the bike frame 10 as best shown in FIG. 2. Each member 50 comprises first substantially L-shaped element 52 disposed to engage the corresponding strut extension 48 and second element 54 telescopingly attached to the first element 52. The rearward interconnect means further includes a coupling means 56 pivotally attached to one of the second elements 54 and removably attached to the opposite second element 54 by the fastening means 58 to hold the rearward members 50 in substantially spaced parallel relationship relative to each other when operatively assembled. The rear support means 42 includes upper and lower elements 60 and 62 respectively. Formed on the lower portion of lower rearward element 62 is a rear securing means 64 for securing the rear assembly 14 to the ground or other supporting surface. As best shown in FIG. 2, the forward and rearward support means 20 and 42 are substantially parallel in spaced relationship relative to one another when in the assembled position.

Rear assembly 14 further includes first, second and third rearward lock means 66, 68 and 70 respectively to operatively lock rearward interconnect means 40 and rearward support means 42 in operative relationship relative to one another. The specific details of first, second and third rearward lock means 66, 68 and 70 respectively are discussed with reference to FIGS. 6 and 7 hereinafter.

As best shown in FIGS. 6 and 7, each of the lock means referred to herein above comprises an aperture 72 formed in the outer or larger element or member and a corresponding aperture 74 formed in the inner or smaller element or member wherein the inner or smaller member has an outwardly biased push button detent lock element 76 having lock member 78 extended through first aperture 74 to move into and out of locking engagement with aperture 72 when operatively assembled. Fixing the length of the extension as desired.

As shown in FIG. 8, the tent covering 80 may comprise canvas or other suitable weatherproof fabric to protect the occupant from the element when the camper is in the erected position. As shown, each end of the canvas cover may include screen window 82. The tent covering also includes a floor 84 and door flap 86 to completely enclose the interior of the camper. Side panels 88 and 90 are attached to the main panel 92 by zippers or snap fasteners along edges 94, 96 and 98. In addition, tie downs 100 may be provided to provide additional securing of the camper.

As best shown in FIG. 1, the front and rear assemblies 12 and 14 respectively are specifically configured to attach to the bicycle frame 10 in the carry or travel position without interferring with the normal operation of the bicycle 10.

To set up the camper, the tent covering 80 is placed on the ground. Then the bicycle is stood on its kickstand with the rear wheel on the flooring 84. The handle bars 24 are then removed permitting attachment of the forward attaching means 16 to the fork. Of course, with suitable coupling means, the forward attachment means 16 may be fixed directly to the handle bar assembly 24 itself. The forward interconnect means 18 is then operatively attached to the forward attachment means 16 by lock means 32 and the forward support means 20 is attached to and locked in operative position relative to the forward interconnect means 18 by lock means 34. The lower element 28 is then extended downwardly to the desired height and locked by lock means 36. The front assembly 12 is then secured to the ground by securing means 30. The rear assembly 14 is similarly positioned by pivoting the rearward interconnect members 50 to extend rearwardly relative to the bike frame and interconnected by the coupling means 56 to maintain their spaced parallel relationship relative to each other. The interconnect members 50 are extended rearwardly and locked in operative position by the first lock means 66. The rear support means 42 is then operatively attached to the rear interconnect means 40 and locked in place by the second rearward lock means 68. The lower rear support element 62 is then extended downwardly relative to the upper support element 60 to the desired position and locked in place by the third rearward lock means 70. The frame thus assembled, the tent covering 80 is then secured thereto to complete the assembly of the collapsible camper.

It will thus be seen that the objects made apparent from the preceding description are efficiently attained, and since certain changes may be made in the above construction without departing from the scope of the invention, it is intended that all matter contained in the above description shall be interpreted as illustrative and not in a limiting sense.

It is also to be understood that the following claims are intended to cover all of the generic and specific features of the invention herein described, and all statements of the scope of the invention which, as a matter of language, might be said to fall therebetween.

Now that the invention has been described, What is claimed is:

1. A collapsible camper configured to support a tent covering on a bicycle frame, said collapsible camper comprising a tent covering and a front and rear assembly, said front assembly including a forward attachment means, forward interconnect means and forward support means, and said rear assembly including a rearward attachment means, rearward interconnect means and rearward support means; said forward attachment means removably coupled to the forward portion of the bicycle frame and extending forward therefrom, said forward interconnect means attached at one end to said forward attachment means and extending forwardly therefrom and to said forward support means at its opposite end to fixedly interconnect said forward attachment means and said forward support means, said forward support means extending laterally outwardly and then downward from said forward interconnect means to engage the ground spaced to one side of said vehicle when operatively assembled; the rearward attachment means is attached to the rear portion of the bicycle frame, said rearward interconnect means attached at one end to said rearward attachment means and extending rearwardly therefrom and to said rearward support means at its opposite end to removably interconnect said rearward attachment means and said rearward support means, said rearward support means extending laterally outwardly and then dowward from said rearward interconnect means to engage the group spaced to the same one side of said vehicle when operatively assembled, said forward and rearward support means being in substantially parallel relationship relative to each other when operatively assembled such that said forward and rearward assemblies and the bicycle frame cooperatively support the tent covering to form a collapsible camper.

2. The camper of claim 15 further including a first forward lock means to detachably interlock said forward attachment means and said forward interconnect means when operatively assembled.

3. The camper of claim 2 further including a second lock means to detachably interlock said forward interconnect means and said forward support means when operatively assembled.

4. The camper of claim 3 wherein said forward support means comprises an upper and lower element movably attached to each other.

5. The camper of claim 4 further including a third forward lock means to operatively interlock said upper and lower elements when operatively assembled.

6. The camper of claim 1 wherein said rearward interconnect means comprises at least one elongated member extending rearwardly of the bicycle when operatively assembled.

7. The camper of claim 6 wherein said rearward interconnect means comprises a pair of elongated members arranged in substantially parallel relationship to each other when operatively assembled.

8. The camper of claim 7 further including coupling means to operatively interconnect said pair of elongated members when operatively assembled.

9. The camper of claim 8 further including a second rearward lock means to detachably interlock said rearward interconnect means and said rearward support means when operatively assembled.

10. The camper of claim 7 wherein each said elongated member comprises a first and second element movably arranged relative to each other.

11. The camper of claim 10 further including a first rearward lock means to operatively interlock said corresponding first and second elements of said elongated members when operatively assembled.

12. The camper of claim 1 wherein said rearward support means comprises an upper and lower element movably attached to each other.

13. The camper of claim 12 further including a third rearward lock means to operatively interlock said upper elements when operatively assembled.

14. The camper of claim 1 wherein said forward and rearward support means each includes securing means formed on the lower portion thereof to secure said tent to the ground when operatively assembled.

* * * * *

UNITED STATES PATENT OFFICE
CERTIFICATE OF CORRECTION

Patent No. 3,913,968   Dated October 21, 1975

Inventor(s) Patrick M. Luppens

It is certified that error appears in the above-identified patent and that said Letters Patent are hereby corrected as shown below:

Column 2, line 13, after "means", first occurrence insert -- locks --.

Column 4, line 67, delete "element" and insert -- elements --.

Column 6, line 21, delete "group" and insert -- ground --.
line 29, delete "15" and insert -- 1 --.

Signed and Sealed this

Tenth Day of August 1976

[SEAL]

Attest:

RUTH C. MASON
Attesting Officer

C. MARSHALL DANN
Commissioner of Patents and Trademarks